(12) United States Patent
Conroy et al.

(10) Patent No.: US 11,089,159 B2
(45) Date of Patent: Aug. 10, 2021

(54) FEEDBACK BASED COMMUNICATION ROUTER

(71) Applicant: Avaya Inc., Santa Clara, CA (US)

(72) Inventors: John Conroy, Galway (IE); Paresh Dhakan, Galway (IE); Richard Simpson, Galway (IE)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/506,811

(22) Filed: Jul. 9, 2019

(65) Prior Publication Data
US 2021/0014357 A1    Jan. 14, 2021

(51) Int. Cl.
*H04M 3/51* (2006.01)
*H04M 3/523* (2006.01)
*H04L 12/58* (2006.01)

(52) U.S. Cl.
CPC .......... *H04M 3/5191* (2013.01); *H04L 51/02* (2013.01); *H04L 51/16* (2013.01); *H04L 51/32* (2013.01); *H04M 3/5175* (2013.01); *H04M 3/5233* (2013.01); *H04M 3/5235* (2013.01); *H04M 2201/42* (2013.01)

(58) Field of Classification Search
CPC ............ H04M 3/5191; H04M 3/5233; H04M 3/5175; H04L 51/16
USPC ............ 379/265.05, 265.01, 265.11, 265.12, 379/266.08, 247
See application file for complete search history.

(56) References Cited

U.S. PATENT DOCUMENTS

| | | | |
|---|---|---|---|
| 2004/0165715 A1* | 8/2004 | Scott ................... | H04M 3/5166 379/265.02 |
| 2013/0163741 A1* | 6/2013 | Balasaygun ........ | H04M 3/4935 379/211.01 |
| 2017/0272574 A1 | 9/2017 | Zhakov | |

FOREIGN PATENT DOCUMENTS

| | | |
|---|---|---|
| CN | 109040489 | 12/2018 |
| WO | WO 2014/081979 | 5/2014 |

OTHER PUBLICATIONS

Official Action with English Translation for China Patent Application No. 202010657123.8, dated Mar. 31, 2021 20 pages.

\* cited by examiner

*Primary Examiner* — Thjuan K Addy
(74) *Attorney, Agent, or Firm* — Sheridan Ross P.C.

(57) ABSTRACT

An inbound communication is received by a contact center. For example, the inbound communication may be a text-based communication. The inbound communication is classified based on feedback from one or more prior inbound communications. For example, the feedback may be based on whether a previous communication was transferred, was dropped, based on feedback provided by a contact center agent, based on feedback provided by a user, and/or the like. In response to classifying the first inbound communication, the inbound communication is routed differently in the contact center. For example, the inbound communication is routed to a different contact center queue based on the feedback of the previous communication.

20 Claims, 3 Drawing Sheets

FIG. 1

200 — PLEASE PROVIDE FEEDBACK FOR THE COMMUNICATION — 201

COMMUICATION ASSIGNED TO THE CORRECT SKILLSET? — 202

● NO  ○ YES — 203

IF NO, PLEASE SELECT THE APPROPRIATE SKILLSET — 204

○ PRODUCT X TECHNICAL SPECIALIST — 205A
○ PRODUCT X GENERAL SUPPORT — 205B
○ PRODUCT X PREMIUM SUPPORT — 205C
● PRODUCT X AUTOMATED ATTENDANT — 205D
○ OTHER PRODUCT — 205E

206

ENTER KEYWORD(S) THAT DESCRIBE THIS COMMUNICATION — 208

[INSTALLATION] — 207

BRIEF DESCRIPTION OF THE COMMUNIATION — 209

[THE CUSTOMER WANTED TO KNOW IF THIS PRODUCT CAN BE INSTALLED ON A ANDROID PHONE.]

[SUBMIT] — 210    [CANCEL] — 211

FEEDBACK BASED COMMUNICATION ROUTER

FIELD

The disclosure relates generally to contact centers and particularly to routing of communications in a contact center

BACKGROUND

Improving customer satisfaction and optimal agent staffing are typically based on efficient routing of a customer's call. Call routing has evolved from Automatic Call Distribution (ACD) to Skillsets-Based Routing (SBR). Over time, the types of communications being routed have changed from primarily voice to more text-based (e.g., emails, chats, social media platforms). To correctly route a traditional voice call, the contact center application uses call information (e.g., calling line ID, dialed number) or input from the customer provided by an Interactive Voice Response (IVR) system. Today, text-based communications are treated more or less the same way as voice calls and are routed using SBR with additional logic of using predefined rules. These predefined rules typically involve parsing the text for predefined keywords and assigning the communication appropriately (e.g., to a specific contact center queue for the skillset). While this generally works, in many cases the actual rules still fall short of routing text-based communications to the appropriate contact center resource. Also, in most cases, the process of routing text-based communications also requires a user to periodically update the predefined rules.

SUMMARY

These and other needs are addressed by the various embodiments and configurations of the present disclosure. An inbound communication is received by a contact center. For example, the inbound communication may be a text-based communication. The inbound communication is classified based on feedback from one or more prior inbound communications. For example, the feedback may be based on whether a previous communication was transferred, was dropped, based on feedback provided by a contact center agent, based on feedback provided by a user, and/or the like. In response to classifying the first inbound communication, the inbound communication is routed differently in the contact center. For example, the inbound communication is routed to a different contact center queue based on the feedback of the previous communication.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
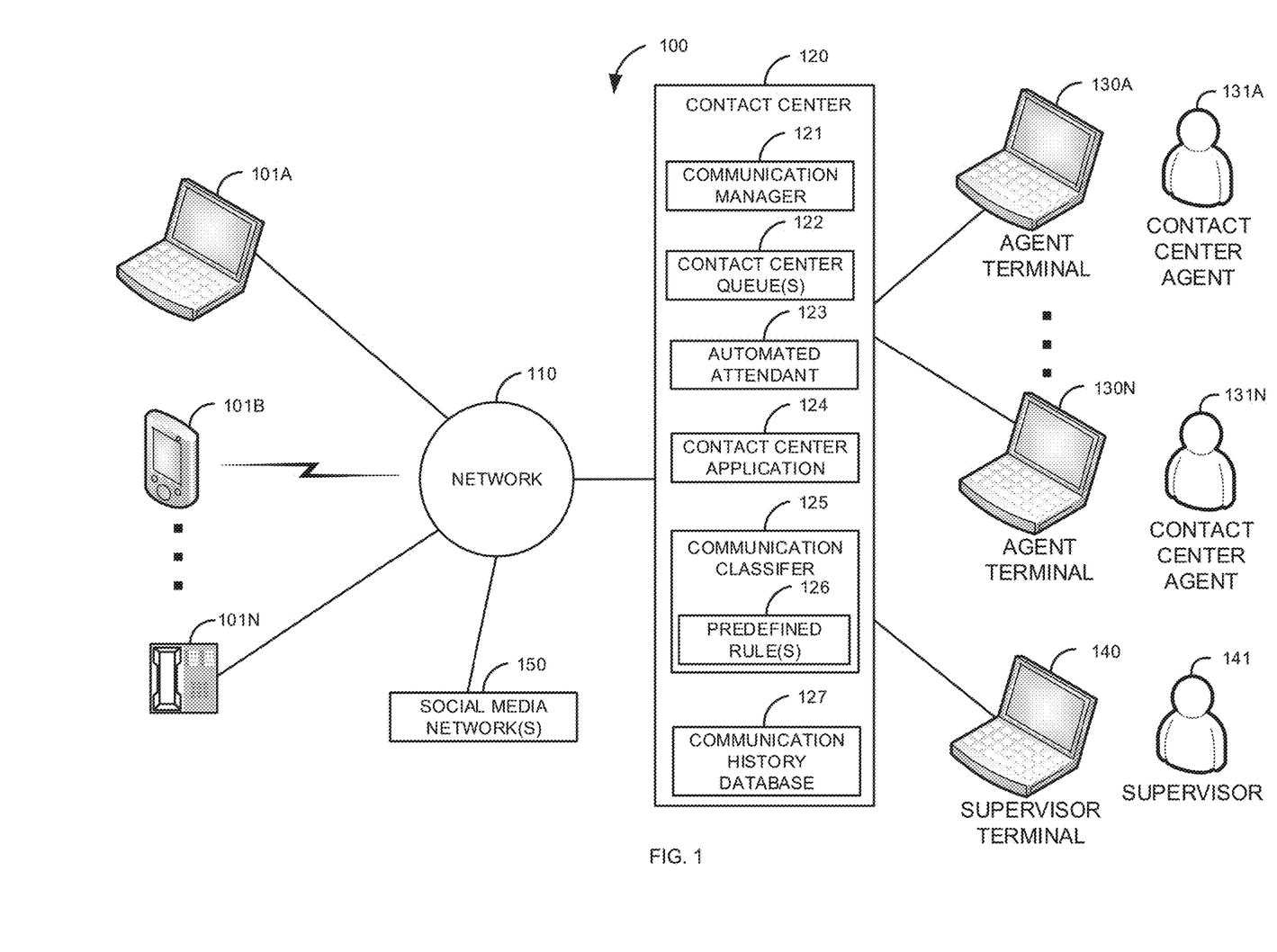
FIG. 1 is a block diagram of a first illustrative system for enhanced routing of communications in a contact center.

FIG. 1 is a block diagram of a first illustrative system 100 for enhanced routing of communications in a contact center 120. The first illustrative system 100 comprises communication endpoints 101A-101N, a network 110, a contact center 120, agent terminals 130A-130N, a supervisor terminal 140, and social media network(s) 150. In addition, FIG. 1 also shows contact center agents 131A-131N and a supervisor 141.

The communication endpoints 101A-101N can be or may include any user communication endpoint device that can communicate on the network 110, such as a Personal Computer (PC), a telephone, a video system, a cellular telephone, a Personal Digital Assistant (PDA), a tablet device, a notebook device, a laptop computer, a smartphone, and the like. The communication endpoints 101A-101N are devices where a communication sessions ends. The communication endpoints 101A-101N are not network elements that facilitate and/or relay a communication session in the network, such as a communication manager 121 or router. As shown in FIG. 1, any number of communication endpoints 101A-101N may be connected to the network 110.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), video protocols, email protocols, text messaging protocols, chat protocols (e.g., Instant Messaging (IM) protocols), and/or the like. Thus, the network 110 is an electronic communication network configured to carry messages via packets and/or circuit switched communications.

The contact center 120 can be or may include any hardware coupled with software that can manage communications between the communication endpoints 101A-101N and any application/device. For example, the contact center 120 can manage communications between the communication endpoints 101A-101N and the agent terminals 130A-130N. The contact center 120 further comprises a communication manager 121, contact center queue(s) 122, an automated attendant 123, a contact center application 124, a communication classifier 125, predefined rule(s) 126, and a communication history database 127.

The communication manager 121 can be or may include any hardware coupled with software that can route and/or manage a communication. The communication manager 121 can route and/or manage communications of various types, such as, voice communications, video communications, email communications, text messages, chat communications (e.g., an Instant Message (IM)), social media communications, virtual reality communications, multimedia communications, and/or the like. The communication manager 121 may route a communication to a communication endpoint 101, to an agent terminal 130, to a contact center queue 122, to an automated attendant 123, to a contact center application 124, to another contact center 120, and/or the like.

The contact center queue(s) 122 can be or may include any computer construct that allows a communication to be placed on hold while waiting to be serviced. The contact center queue(s) 122 can hold one or more communications. The contact center queue(s) 122 may hold a specific type of communication (e.g., voice) or a combination of communication types, (e.g., voice, video, email, text messaging, social media messages, and/or the like).

The automated attendant 123 can be or may include any hardware coupled with software that can automatically answer a communication. For example, the automated attendant 123 may be an Interactive Voice Response (IVR) system, an automated email answering attendant, an automated chat session attendant, an automated text messaging attendant, an automated social media attendant, and/or the like.

The contact center application 124 can be or may include any hardware coupled with software that can be involved in a communication, such as, a Back-to-Back (B2BUA), a recording application, a voicemail application, a web page, and/or the like.

The communication classifier 125 can be or may include any hardware coupled with software that can use information to classify how a communication can be routed/managed in the contact center 120. The communication classifier 125 may use information provided from the communication history database 127, from feedback provided by the contact center agents 131A-131N/supervisor 141, from feedback provided by a user, from routing information provided by the communication manager 121, and/or the like.

The communication classifier 125 further comprises predefined rule(s) 126. The predefined rules 126 are initial rules that are defined to be used until the communication classifier 125 receives enough feedback to generate new rules for routing communications in the contact center 120.

The communication history databased 127 can be or may include any type of database for storing information, such as, a relational database, a file system, a directory service, an object oriented database, and/or the like. The communication history database 127 can store any kind of information associated with a previous communication, such as, a time, a date, participants in the previous communication, text of the communication, voice/video of the previous communication, elements involved in the previous communication (e.g., an agent terminal 130, an automated attendant 123, etc.), transfer information, dropped communication information, contact center queue(s) 122 involved in the previous communication, and/or the like.

The social media network(s) 150 can be or may include any type of social media network 150, such as, Twitter®, Facebook®, LinkedIn®, and/or the like. The social media network(s) 150 may comprise a plurality of social media networks 150 provided by different vendors.

The contact center agents 131A-131N can be or may include any human agent that can answer/manage communications. A contact center agent 131 may be a supervisor 141. The supervisor 141 is a human agent that manages the contact center agents 131A-131N and resources within the contact center 120.

Figure 2:
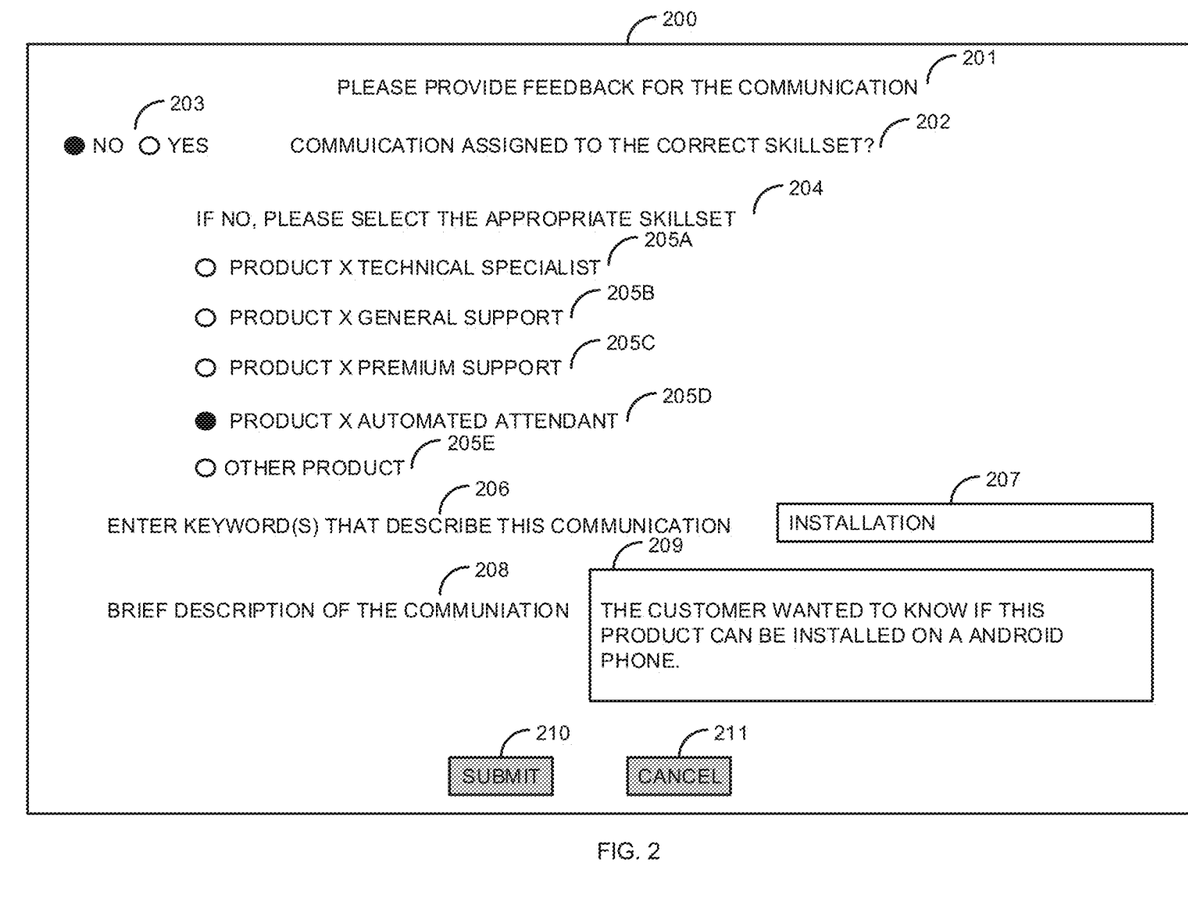
FIG. 2 is a diagram of a user interface for providing feedback to enhance routing of communications in a contact center.
Figure 3:
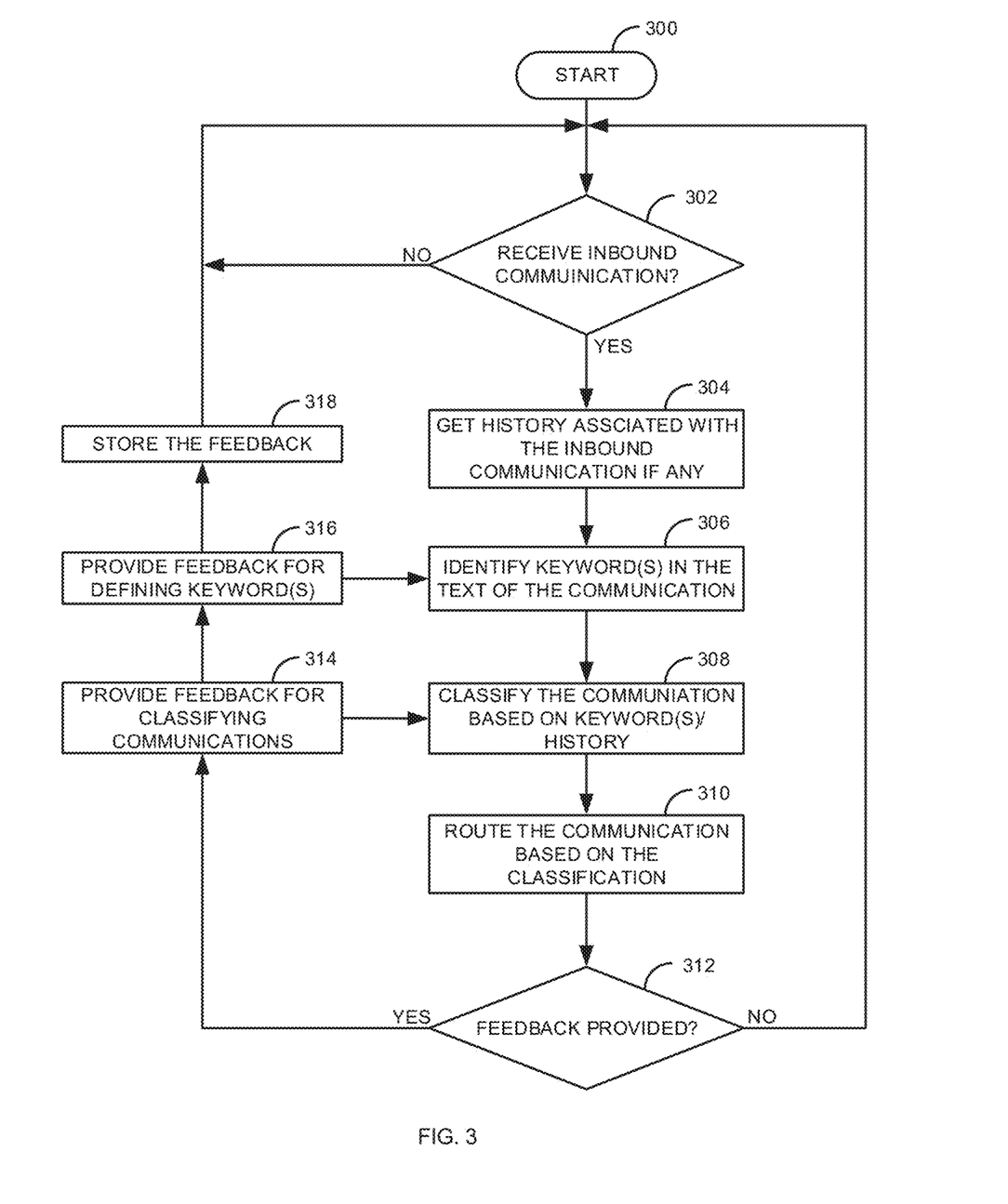
FIG. 3 is a flow diagram of a process for enhanced routing of communications in a contact center.

FIG. 2 is a diagram of a user interface 200 for providing feedback to enhance routing of communications in a contact center 120. Illustratively, communication endpoints 101A-101N, the contact center 120, the communication manager 121, the contact center queue(s) 122, the automated attendant 123, the contact center application 124, the communication classifier 125, the predefined rule(s) 126, the communication history database 127, the agent terminals 130A-130N, the supervisor terminal 140, and the social media network(s) 150 are stored-program-controlled entities, such as a computer or microprocessor, which performs the method of FIGS. 2-3 and the processes described herein by executing program instructions stored in a computer readable storage medium, such as a memory (i.e., a computer memory, a hard disk, and/or the like). Although the methods described in FIGS. 2-3 are shown in a specific order, one of skill in the art would recognize that the steps in FIGS. 2-3 may be implemented in different orders and/or be implemented in a multi-threaded environment. Moreover, various steps may be omitted or added based on implementation.

The user interface 200 comprises a feedback message 201, a skillset assessment message 202, a skillset assessment yes/no radio button 203, an appropriate skill set message 204, a product X technical specialist selection 205A, a product X general support selection 205B, a product X premium support selection 205C, a product X automated attendant selection 205D, another product selection 205E, an enter keywords message 206, an enter keywords text field 207, a description message 208, a description field 209, a submit button 210, and a cancel button 211.

The user interface 200 is typically displayed to a contact center agent 131 after the contact center agent 131 has handled a communication. For example, an email may be initially sent to a specific contact center queue 122 based on information that is in the email (i.e., the text of the email). The email is then sent from the contact center queue 122 to a contact center agent 131 via the agent terminal 130. After responding to the email, the agent terminal 130 displays the user interface 200 to the contact center agent 131 so that the contact center agent 131 can provide feedback for the email communication.

The feedback message 201 asks the contact center agent 131 to provide feedback for the communication. The skillset assessment message 202 asks the contact center agent 131 to select whether the communication was assigned to the correct skillset. A skillset is where the contact center agent 131 possesses the particular skills to address the reason why the user is communicating with the contact center 120. Individual contact center queues 122 are typically defined to be supported by contact center agents 131 that have the necessary skills. For example, if the user is calling about product X, the user should be placed in the contact center queue 122 that supports product X. The contact center agent 131 selects the skillset assessment yes/no radio button 203 to select whether the communication was assigned (i.e., routed) to the contact center agent 131 who possesses the correct skillset.

If the contact center agent 131 selects the "NO" option on the skillset assessment yes/no radio button 203 as shown in FIG. 2, the appropriate skill set message 204 is displayed along with the selections 205A-205E. The contact center agent 131 can then select the appropriate selection 205A-205E. For example, as shown in FIG. 2, the contact center agent 131 has selected the product X automated attendant selection 205D. The product X automated attendant selection 205D indicates that the communication should have been routed to the automated attendant 123 instead of being routed to the contact center agent 131 via the agent terminal 130. For example, the text of the email may have contained a simple question that could have been easily answered by the automated attendant 123. The feedback information allows the communication classifier 125 to better identify how future communications should be routed in the contact center 120. This way future communications are streamlined in the contact center 120. As a result, the contact center 120 becomes more efficient.

In addition, the contact center agent 131 may also be asked to enter one or more keywords. For example, the enter keywords message 206 and the enter keywords text field 207 may be displayed to the contact center agent 131. In FIG. 3, the contact center agent 131 has entered the word "INSTALLATION" in the enter keywords text field 207. The entered keyword(s) are used by the communication classifier as feedback to enhance routing of future communications in the contact center 120.

The description message 208 indicates to the contact center agent 131 to enter a brief description of the communication (e.g., a summary). The contact center agent 131 can enter the brief description by selecting the description field 209 and typing the brief description. The entered description is used by the communication classifier as feedback to enhance routing of future communications in the contact center 120

The contact center agent 131 can submit the feedback by selecting the submit button 210. In addition, the contact center agent 131 can select the cancel button 211 to close the user interface 200.

The user interface 200 described in FIG. 2 is provided to the contact center agent 131. However, in other embodiments, feedback may also (or only) be solicited from the user who initiated the inbound communication. For example, the user may be asked if he/she felt that the communication was assigned to the correct contact agent 131 (e.g., did the contact center agent 131 answer your questions properly). The user may be able to select from options regarding the appropriate skill set as described in FIG. 2. In addition, the user may also be able to enter keywords and a description.

The processes described in FIG. 2 is one way of providing feedback for a communication. However, as one of skill in the art would recognize, other ways of gathering feedback may be used. For example, other types of graphical user interface elements may be used, such as, menus, avatars, icons, and/or the like. In addition, the feedback may be provided audibly using an IVR system or camera (e.g., using gestures/sign language).

Other types of feedback may be provided by the contact center agent 131/user. For example, the feedback may indicate if a sale was made, if the user blocked or unfriended the contact center 120/contact center agent 131, and/or the like.

FIG. 3 is a flow diagram of a process for enhanced routing of communications in a contact center 120. The process starts in step 300. The communication manager 121 determines, in step 302, if an inbound communication is received. The inbound communication is typically a text-based inbound communication, such as, an email communication, a chat communication, a text messaging communication, a social media communication (e.g., a user posted a message on the social media network 150, which triggers the inbound communication), and/or the like. However, the communication of step 302 is not limited to text-based communications (e.g., the communication may be a voice or video communication).

If an inbound communication was not received in step 302, the process of step 302 repeats. Otherwise, if an inbound communication is received in step 302, the contact center 120 may, in one embodiment, spin off a separate thread/process for each inbound communication received in the contact center 120. For example, the thread/process for each inbound communication may be used for steps 304-318.

The communication classifier 125 gets, in step 304, any history associated with the inbound communication. The history may comprise other communications that the contact center 120 has had with the user. For example, the communication may be an email communication and the history may include prior communications with the same user in the same or different communications mediums (e.g., voice, video, email, text messaging, chat, and/or the like). The communication classifier 125 may get historical context information by searching the inbound communication. For example, the historical context information may be gathered from: an email chain associated with an email, previous messages in a chat session, previous posts by the user or other users on a social media network 150, previous text messages by the user, voicemail messages left by the user, and/or the like.

In addition, the communication classifier 125 may use current context information. The current context information can be or may or may include information, such as, a location of the user, a dialect spoken/written by the user, a language spoken/written by the user, an emotional state/sentiment of the user (e.g., as learned from the text or voice), and/or the like.

The communication classifier 125 identifies keyword(s) in the text of the communication in step 306. The classification identifier may identify keyword(s) based on voice. For example, an IVR system (an automated attendant 123) may be used where the user provides an initial summary of why the user is calling (e.g., doing a voice-to-text translation).

The keyword(s) may be a single word or phrase. The keyword(s) that are used in step 306 are automatically learned over time based on feedback/history from previous communications. For example, the communication classifier 125 may identify the keywords "not working" and/or "frustration" that are associated with the feature "installation" for the software product X based on feedback/history of previous communications with the contact center 120 regarding product X.

The communication classifier 125 classifies the communication based on the keyword(s)/history in step 308. For example, based on the keywords "not working" and/or "frustration" that are associated with the feature "installation" for the software product X, the communication classifier 125 may place the communication into a specific contact center queue 122 that provides technical support for the software product X.

The identified keyword(s)/classification of step 306/308 may use additional information as feedback that is associated with the previous communications to further improve the classification process. For example, the communication classifier 125 may use information gathered by the communication manager 121, such as, if the communication was transferred (e.g., to another contact center queue 122 or contact center agent 131), if the communication was dropped (e.g., a dropped chat communication, a dropped voice communication, a dropped video communication, and/or the like), where the user never responded to an email/text message, and/or the like.

Based on the classification of step 308, the communication manager 121 routes, in step 310, the communication based on the classification. The communication manager 121 may route the communication to different places based on the classification. For example, the communication may be routed to a specific contact center queue 122, a specific agent terminal 130, the supervisor terminal 140, a specific automated attendant 123, a specific contact center application 124, another contact center 120, and/or the like. In addition, other events may occur based on the classification, such as, notifying a supervisor terminal 140 of the communication.

The communication classifier 125 determines, in step 312, if feedback has been provided for the communication. The feedback may be provided via the user interface 200, via the communication manager 121 (e.g., was the communication transferred, dropped, etc.), via the automated attendant 123, via the contact center application 124, and/or the like. If there is no feedback provided in step 312, the process goes to step 302. Otherwise, if feedback has been provided in step 312, the communication classifier 125 provides, in step 314, the feedback for classifying the communications in step 308. The feedback for classifying the communications of step 314 may be based on the feedback provided in the user interface 200. For example, if the communication was transferred to a different contact center agent 131 that supports a different product (e.g., the contact center agent 131 selects the "NO" option in the skillset assessment yes/no radio button 203), this information is used to automatically learn that this particular communication was not initially routed properly. The automatic learning process can be based on a learned trend where multiple communications have a similar problem. Thus, for future communications, the communications will be automatically routed to the correct destination.

The communication classifier 125 provides, in step 316, feedback for defining keyword(s). For example, as shown in FIG. 2, the contact center agent 131 can enter keyword(s) into the enter keywords text field 207. The communication classifier 125 may use the entered keyword(s) to identify a trend of misrouted communications based on the same or similar keywords being entered into the enter keywords text field 207. The keyword(s) may be classified based on a specific contact center agent 131. For example, one contact center agent 131 may use different keyword(s) for the same problem versus another contact center agent 131. The identified keyword(s) may be based on the text/voice of the communication. For example, the communication classifier 125 may identify similar keywords being used in the text/voice of similar misrouted communications. Based on the trend, the communication classifier may use new keyword(s) in step 306 for future communications.

The communication classifier 125 stores the feedback in step 318. The process then goes back to step 302 to wait for another inbound communication.

The process described in FIG. 3 may initially use the predefined rule(s) 126. For example, for the initial inbound communications received in the contact center 120, the communication classifier 125 may use the predefined rule(s)

126. However, over time, the predefined rule(s) 126 will be replaced as the communication classifier 125 receives feedback that is used to make better routing decisions over time.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A contact center comprising:
a microprocessor; and
a computer readable medium, coupled with the microprocessor and comprising microprocessor readable and executable instructions that, when executed by the microprocessor, cause the microprocessor to:
receive a first inbound communication from a user;
classify the first inbound communication, wherein the first inbound communication is classified based on feedback from one or more prior inbound communications;
in response to classifying the first inbound communication, route the first inbound communication in the contact center; and
receive new feedback from at least one agent, the new feedback including information about whether the first inbound communication was assigned to an agent with a correct skillset for addressing the first inbound communication.

2. The contact center of claim 1, wherein routing the inbound first communication in the contact center comprises at least one of:
routing the first inbound communication to a specific contact center queue;
routing the first inbound communication to a specific agent terminal;
routing the first inbound communication to a specific contact center application;
routing the first inbound communication to a specific automated attendant;
routing the first inbound communication to another contact center; and
notifying a supervisor agent terminal of the first inbound communication.

3. The contact center of claim 1, wherein classifying the first inbound communication further comprises identifying a context for the first inbound communication by searching:
an email chain associated with the first inbound communication;
a chat session associated with the first inbound communication;
a social media network associated with a user who posted the first inbound communication; and
a voicemail message associated with the first inbound communication.

4. The contact center of claim 1, wherein classifying the first inbound communication comprises identifying one or more new keywords to search for in the first inbound communication based on the feedback from one or more prior inbound communications.

5. The contact center of claim 1, wherein the microprocessor readable and executable instructions further cause the microprocessor to:
provide information to generate a graphical user interface to receive the feedback from one or more prior inbound communications for the one or more prior inbound communications; and
receive the feedback from one or more prior inbound communications for the one or more prior inbound communications.

6. The contact center of claim 1, wherein at least one of the one or more prior inbound communications is classified and routed based on a predefined rule and wherein the first inbound communication is not classified and is not routed based on the predefined rule.

7. The contact center of claim 1, wherein the first inbound communication is from a specific user and wherein classifying the first inbound communication is further based on one or more communications with the specific user in mediums other than that of the first inbound communication.

8. The contact center of claim 1, wherein the microprocessor readable and executable instructions further cause the microprocessor to:
receive a second inbound communication;
classify the second inbound communication, wherein the second inbound communication is classified based on feedback from first inbound communication;
in response to classifying the second inbound communication, route the second inbound communication differently from the first inbound communication.

9. The contact center of claim 1, wherein the feedback from one or more prior inbound communications comprises at least one of: identifying a matching skillset, providing one or more keywords associated an individual prior communication, identifying if the individual prior communication was transferred, identifying a dropped chat communication, identifying a dropped voice communication, identifying a dropped video communication, identifying a non-response to an email, and capturing a summary of the individual prior communication.

10. The contact center of claim 1, wherein the first inbound communication is a text-based communication and wherein the classification of the first inbound communication is classified based on a text of the text-based communication and the feedback from one or more prior inbound communications.

11. A method comprising:
receiving, by a microprocessor, a first inbound communication from a user;
classifying, by the microprocessor, the first inbound communication, wherein the first inbound communication is classified based on feedback from one or more prior inbound communications;
in response to classifying the first inbound communication, routing, by the microprocessor, the first inbound communication in a contact center; and
receiving new feedback from at least one agent, the new feedback including information about whether the first inbound communication was assigned to an agent with a correct skillset for addressing the first inbound communication.

12. The method of claim 11, wherein routing the inbound first communication in the contact center comprises at least one of:
routing the first inbound communication to a specific contact center queue;
routing the first inbound communication to a specific agent terminal;
routing the first inbound communication to a specific contact center application;
routing the first inbound communication to a specific automated attendant;
routing the first inbound communication to another contact center; and
notifying a supervisor agent terminal of the first inbound communication.

13. The method of claim 11, wherein classifying the first inbound communication further comprises identifying a context for the first inbound communication by searching:
an email chain associated with the first inbound communication;
a chat session associated with the first inbound communication;
a social media network associated with a user who posted the first inbound communication; and
a voicemail message associated with the first inbound communication.

14. The method of claim 11, wherein classifying the first inbound communication comprises identifying one or more new keywords to search for in the first inbound communication based on the feedback from one or more prior inbound communications.

15. The method of claim 11, further comprising:
providing information to generate a graphical user interface to receive the feedback from one or more prior inbound communications for the one or more prior inbound communications; and
receiving the feedback from one or more prior inbound communications for the one or more prior inbound communications.

16. The method of claim 11, wherein at least one of the one or more prior inbound communications is classified and routed based on a predefined rule and wherein the first inbound communication is not classified and is not routed based on the predefined rule.

17. The method of claim 11, further comprising:
receiving a second inbound communication;
classifying the second inbound communication, wherein the second inbound communication is classified based on feedback from first inbound communication;
in response to classifying the second inbound communication, routing the second inbound communication differently from the first inbound communication.

18. The method of claim 11, wherein the feedback from one or more prior inbound communications comprises at least one of: identifying a matching skillset, providing one or more keywords associated an individual prior communication, identifying if the individual prior communication was transferred, identifying a dropped chat communication, identifying a dropped voice communication, identifying a dropped video communication, identifying a non-response to an email, and capturing a summary of the individual prior communication.

19. The method of claim 11, wherein the first inbound communication is a text-based communication and wherein the classification of the first inbound communication is classified based on a text of the text-based communication and the feedback from one or more prior inbound communications.

20. A system comprising:
a microprocessor; and
a computer readable medium, coupled with the microprocessor and comprising microprocessor readable and executable instructions that, when executed by the microprocessor, cause the microprocessor to:
receive an inbound communication from a user;
classify the inbound communication, wherein the inbound communication is classified based on feedback from one or more prior inbound communications;
in response to classifying the inbound communication, route the inbound communication; and
receive new feedback from at least one agent, the new feedback including information about whether the inbound communication was assigned to an agent with a correct skillset for addressing the inbound communication.

\* \* \* \* \*